United States Patent
Bancroft et al.

(10) Patent No.: US 6,959,909 B2
(45) Date of Patent: Nov. 1, 2005

(54) ACTUATING HANDLE ASSEMBLY

(75) Inventors: Philip W. Bancroft, Belvidere, NJ (US); Steven A. Wortmann, Easton, PA (US)

(73) Assignee: Victaulic Company of America, Easton, PA (US)

( * ) Notice: Subject to any disclaimer, the term of this patent is extended or adjusted under 35 U.S.C. 154(b) by 30 days.

(21) Appl. No.: 10/764,616

(22) Filed: Jan. 26, 2004

(65) Prior Publication Data

US 2005/0161624 A1  Jul. 28, 2005

(51) Int. Cl.[7] .............................................. F16K 51/00
(52) U.S. Cl. ...................... 251/109; 251/285; 251/286; 137/385
(58) Field of Search ............................... 251/285–288, 251/101, 107, 109; 137/385; 74/526

(56) References Cited

U.S. PATENT DOCUMENTS

| | | | | |
|---|---|---|---|---|
| 2,994,503 A | | 8/1961 | Smith ........................... 251/110 |
| 3,384,339 A | | 5/1968 | Cornell, III ................... 251/291 |
| 3,722,853 A | | 3/1973 | Dargatz et al. ............. 251/110 |
| 3,744,752 A | | 7/1973 | Massey ....................... 251/292 |
| 3,807,254 A | * | 4/1974 | Brakebill ..................... 74/526 |
| 3,865,130 A | | 2/1975 | Mullis ......................... 137/385 |
| 4,126,023 A | | 11/1978 | Smith et al. ................. 70/177 |
| 4,429,711 A | * | 2/1984 | Schomer ..................... 137/385 |
| 4,570,901 A | | 2/1986 | Holtgraver .................. 251/98 |
| 4,699,168 A | | 10/1987 | Hauffe et al. ............... 137/385 |
| 4,815,693 A | | 3/1989 | James et al. ................ 251/14 |
| 4,909,275 A | | 3/1990 | Massey et al. .............. 137/385 |
| 4,944,325 A | | 7/1990 | Baldwin et al. ............ 137/375 |
| 5,183,073 A | | 2/1993 | Roberts ....................... 137/385 |
| 5,299,597 A | | 4/1994 | Fort et al. ................... 137/385 |
| 5,365,759 A | | 11/1994 | Bonomi ....................... 70/177 |
| 5,579,804 A | | 12/1996 | Roberts ....................... 137/385 |
| 5,598,724 A | | 2/1997 | Primeau ...................... 70/177 |
| 5,647,389 A | | 7/1997 | Holloway .................... 137/15 |
| 5,709,112 A | | 1/1998 | Kennedy ..................... 70/177 |
| 6,209,366 B1 | * | 4/2001 | Zagoroff ...................... 70/208 |

OTHER PUBLICATIONS

Danfoss Water Valves Catalog (2 pages) dated Jan. 1998.
Photograph of Valve Handle.

* cited by examiner

*Primary Examiner*—Justine R. Yu
*Assistant Examiner*—Peter deVore
(74) *Attorney, Agent, or Firm*—Synnestvedt & Lechner LLP

(57) ABSTRACT

A handle assembly mountable on a valve is disclosed. The assembly includes a head having a receptacle engageable with a rotatable shaft on the valve and a grip projecting outwardly from the head to facilitate turning of the head for actuating the valve. An arcuate slot is positioned in the head, the slot having a curvature matched to the arcuate motion of the handle when used to turn the valve shaft. A limit post is attached to the valve and projects through the slot. A jam nut is mounted on the post adjacent to the head. When tightened against the head the jam nut fixes the position of the head relatively to the valve. A bolt is positioned within the slot and retained by a nut. The bolt is movable along the slot to a predetermined position where it can be temporarily fixed by tightening the nut. The bolt acts as a memory stop when it engages the limit post as the head is turned.

17 Claims, 7 Drawing Sheets

ACTUATING HANDLE ASSEMBLY

FIELD OF THE INVENTION

This invention concerns handle assemblies for use with manually actuatable devices, such as valves.

BACKGROUND OF THE INVENTION

Devices such as valves for fluid control are often actuated and adjusted manually in industrial installations in the course of operation of various industrial processes such as petroleum refining, paper manufacture, mining, chemical production and waste water treatment plants to cite but a few examples. Manual adjustment of valves allows the industrial processes controlled by the fluid flow through the valves to be optimized for various factors such as product yield, throughput, reaction rate, as well as other parameters associated with the economics and efficiency of the processes.

It is desirable to incorporate refinements into the valve design that will allow for convenient setting of the valves to known positions providing fluid flow rates determined either theoretically or during operation of the industrial processes that produce the desired yield, reaction rate, throughput or other process parameters. Infinite variability of the setting is advantageous for precise tuning of system parameters.

Additional desirable refinements to valves also include the ability to lock the valve in the closed or open positions. Locking the valve in the closed position will help prevent mishaps during system maintenance, when portions of the system may be disassembled for replacement or repair. Locking the valve in the open position will help ensure that fluid flow is not halted inadvertently during operation. It is also advantageous to have the valve be tamper resistant to prevent unauthorized opening of the valve and thereby prevent theft of the product flowing through the system. The aforementioned refinements for devices such as valves may be effected using handle assemblies as described and claimed below.

SUMMARY OF THE INVENTION

The invention concerns a handle assembly engageable with a shaft extending from a device, such as a valve, for rotating the shaft to actuate the device. The handle assembly comprises a head having a receptacle therein sized to receive the shaft. The shaft rotates with the head. An elongated grip is attached to the head and projects outwardly therefrom. The grip facilitates manual rotation of the head when the handle assembly is mounted on the device. An arcuate slot is positioned in the head and has a concave side facing the receptacle. The slot preferably has first and second ends disposed opposite to one another. A limit post is fixedly attachable to the device and projects into the slot. The limit post is engageable with at least one of the first and second ends of the slot to limit rotation of the head relatively to the device. A stop body is positioned within the slot and movable along it to a predetermined position between its first and second ends. The stop body has first and second gripping surfaces positioned on opposite sides of the head. The gripping surfaces are engageable with the head, at least one of the gripping surfaces is movable into and out of engagement with the head for compressing the head between the gripping surfaces and thereby temporarily fixing the stop body at the predetermined position. The stop body is engageable with the limit post upon rotation of the head to limit rotation of the head.

The handle assembly may also include a hold fast body for temporarily preventing rotation of the head and thereby fix it and the shaft in a predetermined position relatively to the device. The hold fast body is fixedly attachable to the device and has a compression member positioned adjacent to the head. The compression member is movable into and out of engagement with the head to compress it and temporarily fix the head in the predetermined position.

The invention also concerns another embodiment of a handle assembly engageable with a shaft extending from a device such as a valve, the handle assembly for rotating the shaft to actuate the device. The handle assembly is engageable with a lock for preventing rotation of the shaft. The handle assembly comprises a head having a receptacle therein sized to receive the shaft, the shaft rotating with the head. A first aperture extends through the head. A plate is fixedly mountable on the device and positionable between the head and the device. The plate has a second aperture extending therethrough. The first and second apertures are alignable with one another for receiving the lock therethrough upon rotation of the head. The lock prevents rotation of the head relatively to the plate when it is engaged with the apertures. An elongated grip is attached to the head. The grip projects outwardly therefrom and facilitates manual rotation of the head when the handle assembly is mounted on the device.

The plate may be attached to the device using a non-removable fastener to make the device tamper resistant. In furtherance of tamper resistance, a blind hole extends through the head and intersects the receptacle. A pin is insertable within the blind hole and is engageable with the shaft for retaining the head to the shaft. The head is substantially non-removable from the shaft upon insertion of the pin into the blind hole and engagement with the shaft, thus, further preventing unauthorized actuation of the device by removing the handle assembly.

DETAILED DESCRIPTION OF THE EMBODIMENTS

Figure 1:
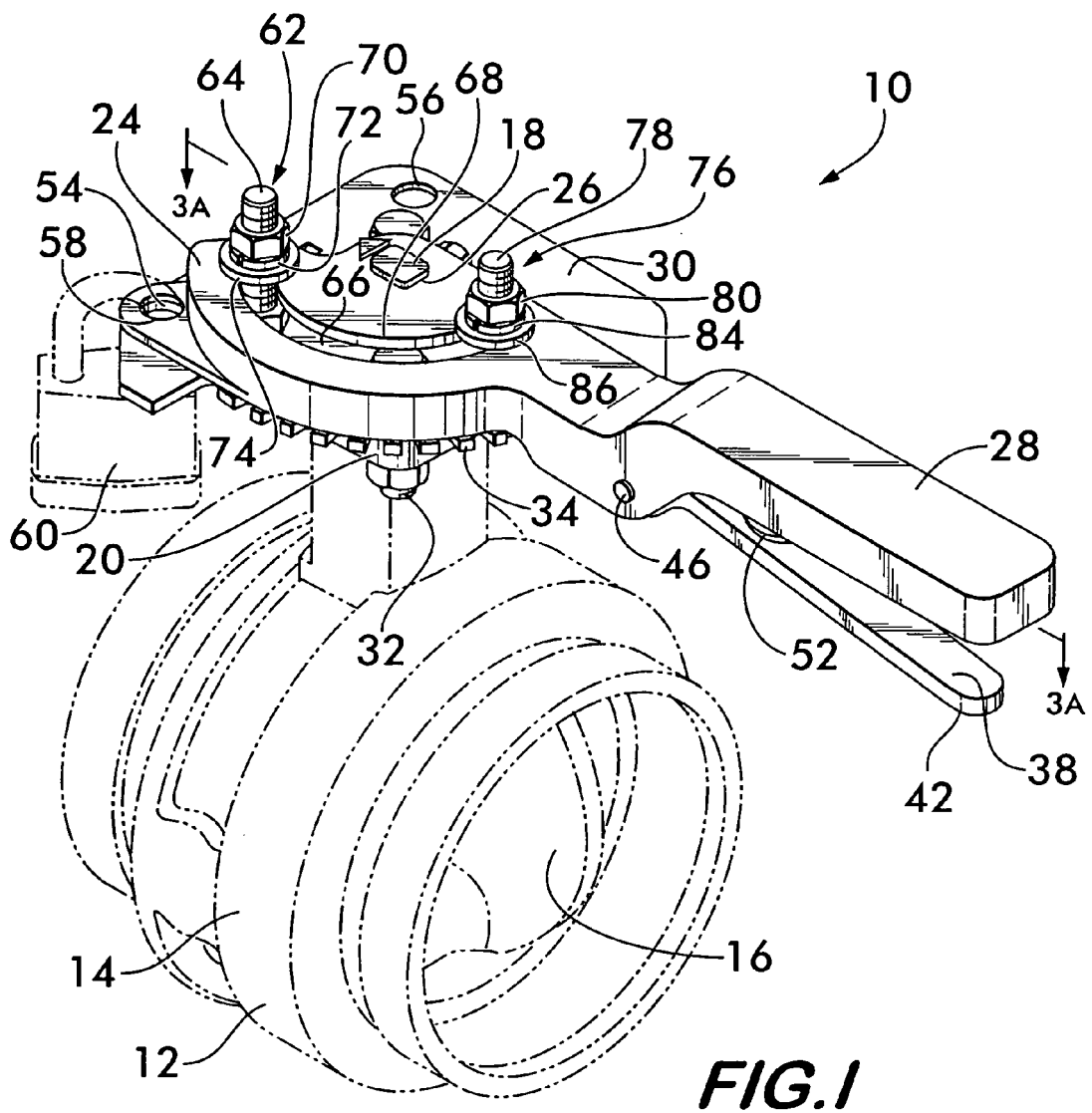
FIG. 1 is a perspective view of a handle assembly mounted on a device, the device shown in phantom line.

FIG. 1 shows a handle assembly 10 mounted on a device, such as a valve 12, the valve being shown by way of example only and not intended to limit the use of the handle assembly to a particular application, the handle assembly 10 being adaptable for use with virtually any device that is manually actuated.

Figure 2:
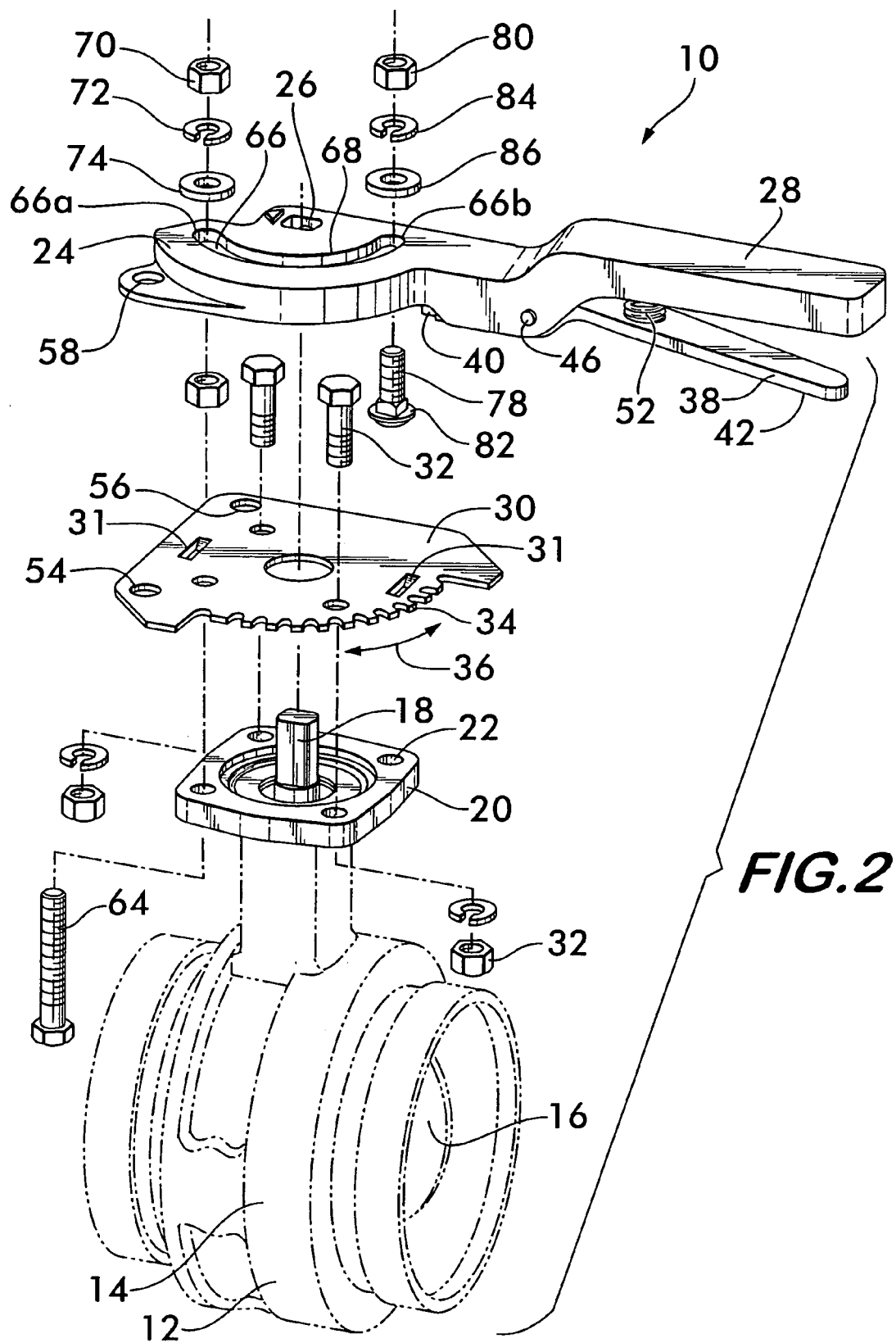
FIG. 2 is an exploded perspective view of the handle assembly shown in FIG. 1.

As best shown in FIG. 2, valve 12 comprises a valve body 14, a valve closure member 16 rotatably mounted within the valve body and a shaft 18 attached to the closure member 16 and extending outwardly from the valve body 14. Rotation of the shaft 18 moves the valve closure member 16 between an open and a closed position to control fluid flow through the line in which the valve 12 is installed. Shaft 18 is surrounded by a flange 20 having various mounting holes 22 that receive fasteners for mounting various actuators on the valve 12, such as the handle assembly 10.

Handle assembly 10 includes a head 24 having a receptacle 26 sized and shaped to receive shaft 18. The head 24 and the shaft 18 rotate together by virtue of the engagement of the shaft and the receptacle 26 in the head. An elongated grip 28 is attached to head 24, the grip projecting outwardly from the head to facilitate manual turning of the head to open and closed valve 12.

Figure 3A:
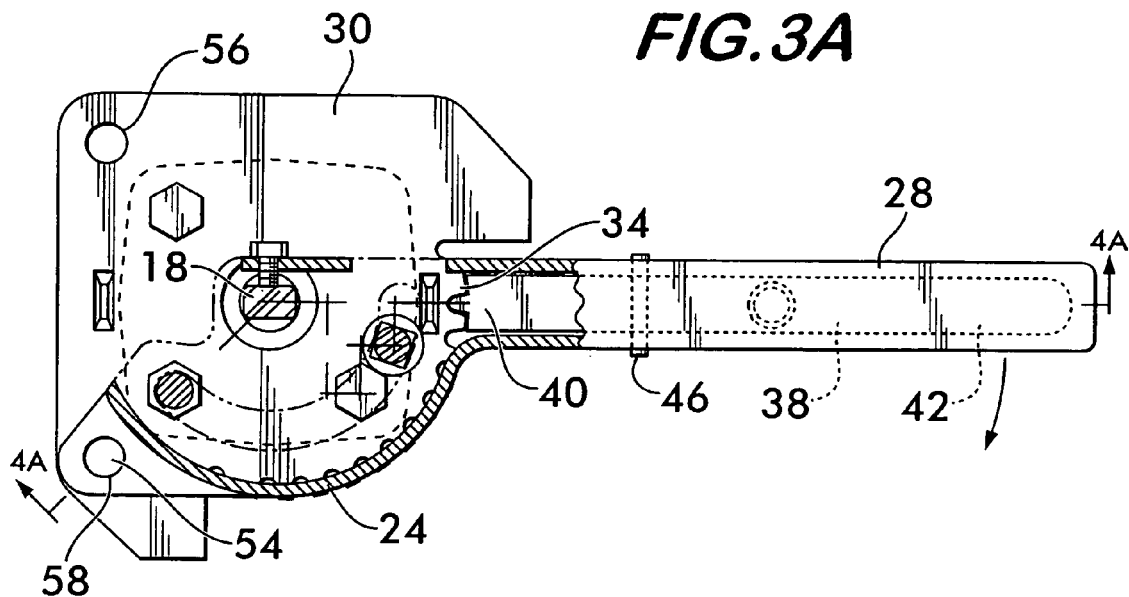
FIGS. 3A and 3B are sectional plan views taken at line 3A—3A of FIG. 1.
Figure 3B:
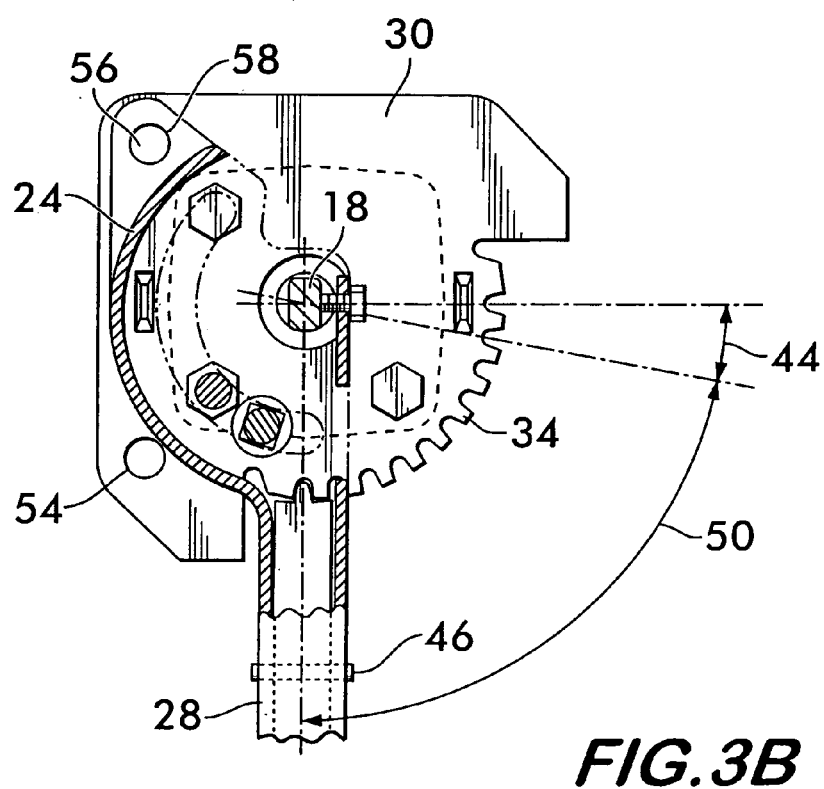

Handle assembly 10 may include a plate 30 mounted beneath head 24 on flange 20 and secured thereto by bolts and nuts 32 engaging holes 22. Plate 30 has indexing projections 31 positioned in spaced apart relation opposite to one another for engagement with flange 20. The indexing projections 31 are preferably formed by punching the projection outwardly from the plate 30 in a stamping operation. The projections 31 are in spaced relation to one another such that they engage the sides of flange 20 when the plate 30 is properly oriented relatively to the valve 12, the flange 20 being sized differently in its cross- sectional dimensions to receive the indexing projections 31 when plate 30 is properly oriented, the projections 31 riding on the upper surface of the flange 20 and preventing proper engagement of the plate 30 with the flange 20 otherwise. Proper positioning of the plate 30 on flange 20 ensures that when the valve 12 is open, the grip 28 aligns with the pipe in which the valve is located, thereby providing a visual indication of whether the valve is open or closed, as is customary. Plate 30 has a plurality of teeth 34 extending outwardly away from receptacle 26 along an arcuate path 36 that matches the arcuate motion of the handle assembly 10 when turned. When the toothed plate 30 is present, an elongated latch 38 is mounted on the grip 28. As shown in FIG. 3A, latch 38 has a first end portion 40 engageable with teeth 34, and a second end portion 42 that extends lengthwise along grip 28. As shown in FIGS. 3A and 3B, engagement of first end portion 40 with teeth 34 allows the grip 28 and head 24 to be temporarily set at any one of a plurality of angles 44 established by the teeth 34, the teeth providing an index for positioning the valve closure member (see FIG. 2) at any one of a plurality of discrete positions and thereby controlling the degree to which the valve is opened or closed.

Figure 4A:
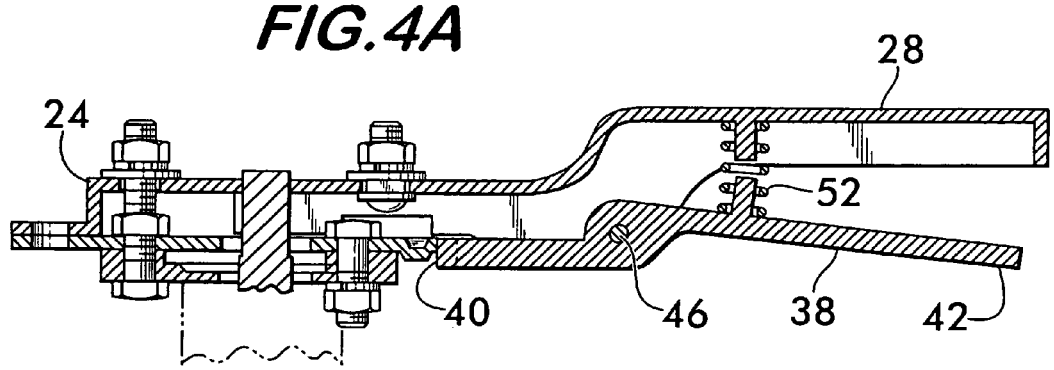
FIGS. 4A and 4B are sectional side views taken at line 4A—4A of FIG. 3A.
Figure 4B:
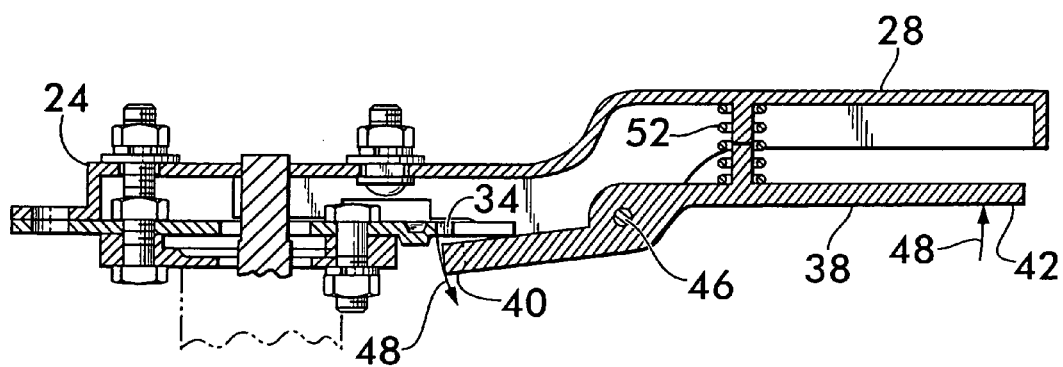

As shown in FIGS. 4A and 4B, the latch 38 is mounted on grip 28 and pivots about axis 46 as indicated by arrows 48. Pivoting motion of the latch is effected manually by applying an upward force to the second end portion 42. This action disengages the first end portion 40 of the latch 38 from teeth 34 and allows the grip 28 and head 24 to be rotated through an arcuate path 50 (see FIG. 3B) to any one of a plurality of discrete positions determined by the interaction of the first end 40 of latch 38 with the teeth 34. As best shown in FIGS. 4A and 4B, latch 38 is biased by a compression spring 52 acting between grip 28 and the second end portion 42 of the latch to normally keep the first end portion 40 in engagement with teeth 34. Other embodiments may use tension springs for biasing, as well as other types of biasing devices.

As shown in FIGS. 1 and 2, plate 30 and head 24 cooperate to allow the handle assembly 10 to be locked in a desired position, for example, in the fully opened or fully closed position. Plate 30 has apertures 54 and 56 that are alignable one at a time with an aperture 58 extending through the head 24. The plate aperture 54 is positioned so that it aligns with head aperture 58 when the valve closure member 16 is in the fully opened position as shown in FIG. 1. Alignment of the apertures 54 and 58 permits them to receive a lock 60, shown in phantom line, that prevents movement of the head 24 relative to the valve 12. If the head 24 is rotated through 900, corresponding to the fully closed position for closure member 16, head aperture 58 aligns with plate aperture 56 (see FIG. 3B) and the aligned apertures 58 and 56 may receive lock 60 for locking the valve 12 in the closed position.

Handle assembly 10 also has features that allow infinite adjustment positioning of the position of closure member 16. Infinite adjustment positioning is effected via a hold fast body 62, shown in FIG. 1. Preferably, as shown in FIG. 2, hold fast body 62, comprises a threaded limit post 64 that is fixedly attached to flange 20 and extends upwardly through an arcuately shaped slot 66 in head 24. A concave side 68 of slot 66 faces the receptacle 26, and the curvature of the slot 66 matches the path of motion of the head 24 when it is rotated to rotate the shaft 18. This allows the head 24 to turn relatively to the limit post 64 without interference. A compression member, preferably in the form of a jam nut 70, is positioned on the limit post 64 adjacent to the head 24. Jam nut 70 may be tightened to compressively engaged the head 24 and temporarily fix the head in a desired predetermined position relatively to valve 12 corresponding to the desired degree of valve opening or closing. Engagement of the jam nut 70 with head 24 is preferably effected through a locking washer 72 and a flat washer 74. The locking washer 72 prevents the jam nut 70 from loosening inadvertently under vibration, and the flat washer 74 acts as a sacrificial surface to prevent gouging of the head 24. Limit post 64 also provides a positive stop when it engages the ends 66a and 66b of slot 66 to confine the motion of the valve closure member between the open and closed positions.

Further infinite adjustment positioning may be effected via a stop body 76, shown in FIG. 1. Stop body 76 acts as a memory stop that allows the head 24 to be rotated to the same predetermined position each time it is actuated. Preferably, as shown in FIG. 2, the stop body 76 is positioned within slot 66 and comprises a threaded bolt 78 extending through the slot 66, and a nut 80 retaining the bolt 78 within the slot. The bolt 78 may be moved to a desired position along the slot 66 between the ends 66a and 66b, and fixed in that position by tightening the nut 80. The head 82 of bolt 78 and the nut 80 act as gripping surfaces positioned on opposite sides of the head 24. When the nut 80 is tightened, it temporarily fixes the bolt 78 in the desired position between the ends 66a and 66b of slot 66. When the head 24 is turned, the stop body 76 engages the limit post 64, preventing further motion of the head 24, positioning the head 24 and, consequently, the valve closure member 16, in a desired position. Gripping between the nut 80 and the head 24 is preferably effected through a locking washer 84 and a flat washer 86. The locking washer 84 prevents the nut 80 from loosening inadvertently under vibration, and the flat washer 86 acts as a sacrificial surface to prevent gouging of the head 24.

Figure 5:
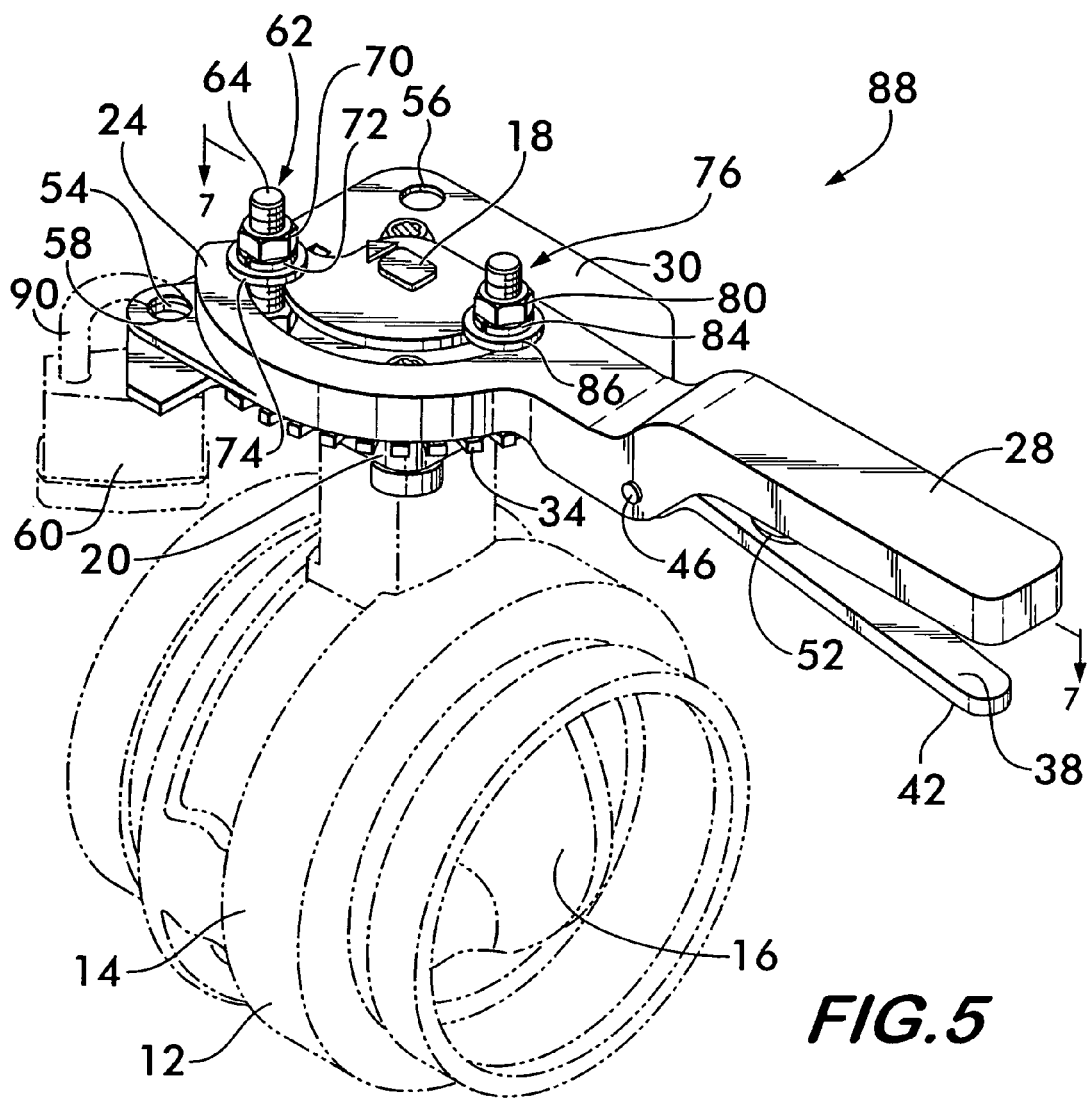
FIG. 5 is a perspective view of another embodiment of a handle assembly mounted on a device, the device shown in phantom line.
Figure 6:
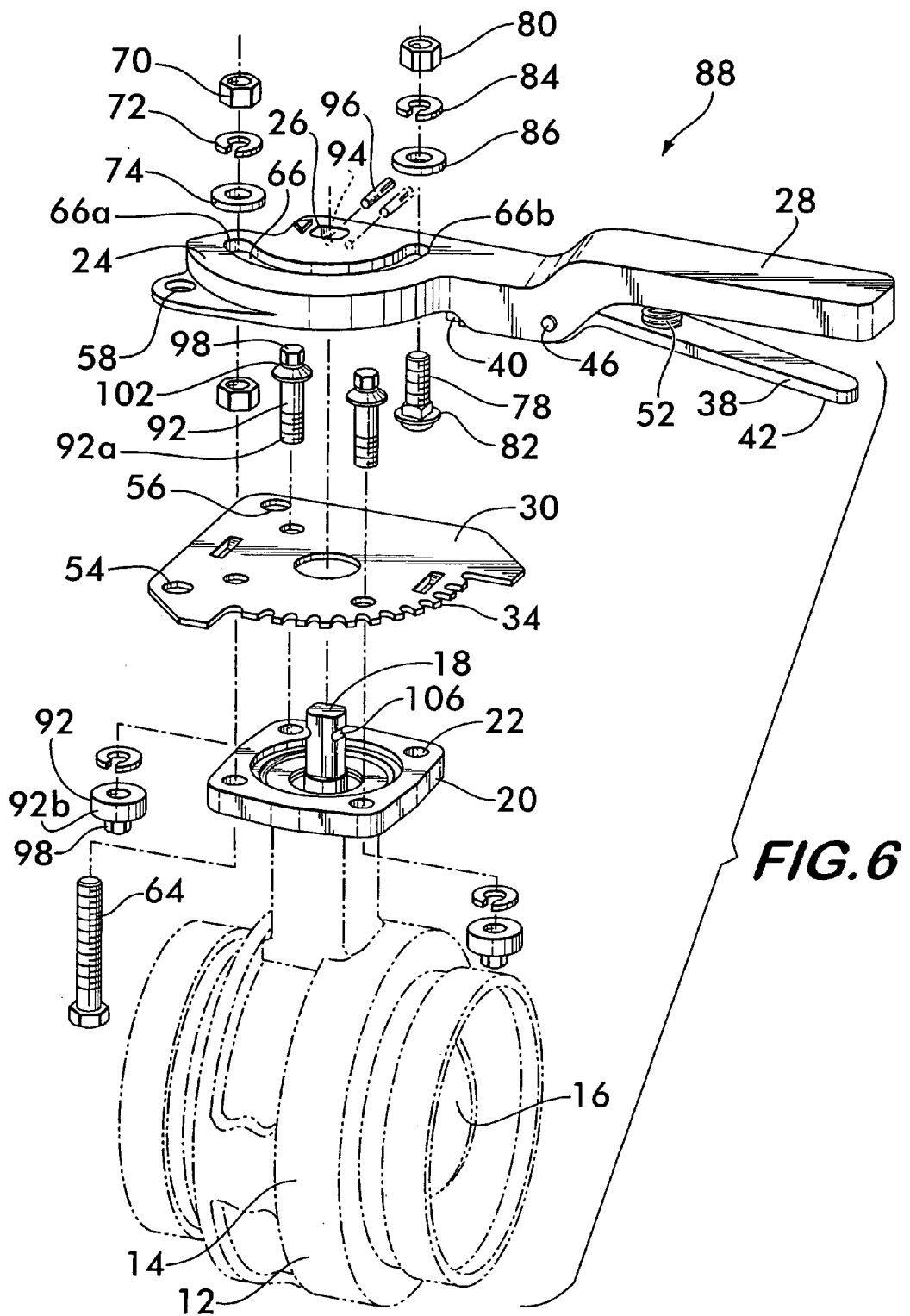
FIG. 6 is an exploded perspective view of the handle assembly shown in FIG. 5.

FIGS. 5 and 6 illustrate a tamper resistant handle assembly 88. As shown in FIG. 5, the tamper resistant embodiment 88 has plate apertures 54 and 56 that can be aligned with head aperture 58 and receive a lock 60 to secure the head 24 in one of two positions. Without further measures, however, the valve 12 could be easily opened by removing jam nut 70 and lifting the head 24 off of the shaft 18 by sliding head aperture 58 along the lock's shackle 90. This would expose shaft 18 which can then be turned using a wrench to open the valve 12.

To render the task of unauthorized opening of valve 12 more difficult, it is advantageous to use tamper resistant, non-removable fasteners 92 to attach the plate 30 to the valve 12 as shown in FIG. 6. The terms "non-removable" and "tamper resistant" refer to fasteners that, once installed, may not be readily or easily removed by tools commonly available, removal of such fasteners requiring destructive methods such as sawing or drilling.

Figure 7:
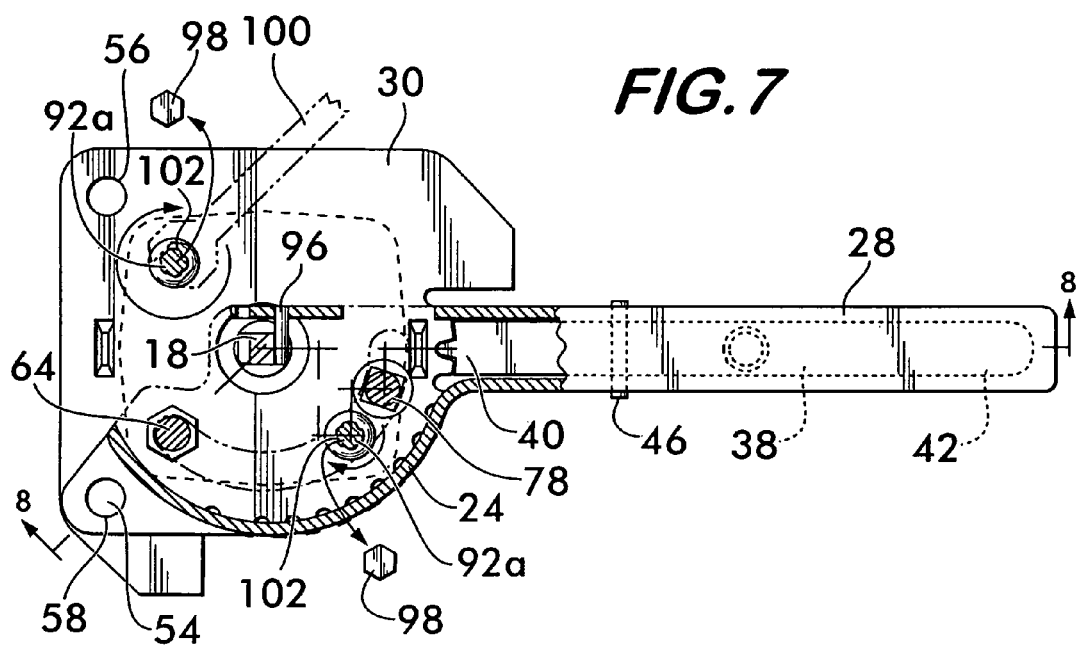
FIG. 7 is a sectional plan view take at line 7—7 of FIG. 5.
Figure 8:
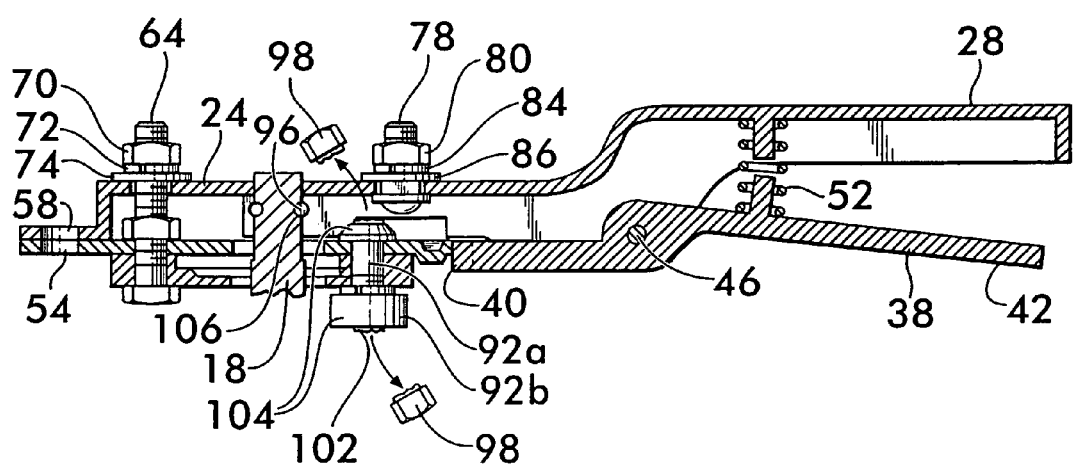
FIG. 8 is a sectional side view taken at line 8—8 of FIG. 7.

The preferred type of non-removable fasteners 92 have breakaway head portions 98 on both the bolt 92a and the nut 92b. As shown in FIG. 7, the breakaway head portions 98 are shaped to allow sufficient torque to be applied to the nut 92b and bolt 92a by means of a tool such as wrench 100 to secure the fastener 92 to the valve. The head portions 98 are attached to the nut 92b and the bolt 92a by a neck 102 having a reduced cross-sectional area which fails upon the application of a predetermined torque greater than is needed to secure the nut to the bolt. As shown in FIG. 8, failure of the neck 102 allows removal of the head portions 98, leaving only smooth retainer portions 104 on the bolt 92a and the nut 92b that do not provide any purchase for tools such as wrenches or pliers, making it very difficult to remove plate 30 using common hand tools. Other examples of tamper resistant/non-removable fasteners include "one-way screws" wherein the slot is deformed so that the screw may only be turned in one direction, as well as fasteners having heads that receive special tools not commonly available.

It is also difficult to remove head 24 when one or more pins 96 are driven into blind holes 94 as shown in FIG. 6. The pins 96 are completely inserted into the holes 94 with none of their length exposed, thereby being inaccessible and denying purchase to tools such as pliers. As shown in FIG. 8, the pins 96 engage grooves 106 in shaft 18, the pins 96 bearing against the grooves 106 and preventing easy removal of head 24.

Handle assemblies according to the invention provide numerous advantages for actuating valves and other devices. The advantages include the capability to temporarily fix the valve closure member in a desired position, to open the valve repeatedly to a predetermined position, to lock the valve in either the closed or open position and to render the valve tamper resistant to common hand tools.

What is claimed is:

1. A handle assembly engageable with a shaft extending from a device, said handle assembly for rotating said shaft to actuate said device, said handle assembly comprising:
    a head having a receptacle therein sized to receive said shaft;
    an elongated grip attached to said head and projecting outwardly therefrom for facilitating manual rotation of said head when said handle assembly is mounted on said device;
    an arcuate slot positioned in said head and having a concave side facing said receptacle, said slot having first and second ends disposed opposite to one another;
    a limit post fixedly attachable to said device so as to project into said slot, said limit post being engageable with at least one of said first and second ends of said slot to limit rotation of said head relatively to said device;
    a stop body positioned within said slot, said stop body having first and second gripping surfaces positioned on opposite sides of said head and engageable therewith, at least one of said gripping surfaces being movable into and out of engagement with said head for compressing said head between said gripping surfaces and thereby temporarily fixing said stop body at a predetermined position in said slot, said stop body being engageable with said limit post to limit rotation of said head;
    a plate fixedly mountable on said device and positionable between said head and said device, said plate having a plurality of teeth extending outwardly away from said receptacle and positioned along an arcuate path; and
    an elongated latch pivotally attached to said grip, said latch having a first end portion engageable with any one of said teeth and a second end portion extending lengthwise along said grip, said first end portion being pivotally movable into and out of engagement with any one of said teeth by manually pivoting said second end portion relatively to said grip to respectively prevent and permit rotation of said head relatively to said plate.

2. A handle assembly according to claim 1, wherein said stop body comprises a threaded bolt and a nut engageable with said bolt, said bolt extending through said slot and having a bolt head comprising said first gripping surface positioned on one side of said head, said nut comprising said second gripping surface and being positioned on an opposite side of said head, said bolt being temporarily fixed in said predetermined position upon tightening of said nut onto said bolt.

3. A handle assembly according to claim 1, further comprising a hold fast body for temporarily preventing rotation of said head, said hold fast body being fixedly attachable to said device, said hold fast body having a compression member positioned adjacent to said head, said compression member being movable into and out of engagement with said head, said head being temporarily fixed in a predetermined position when said compression member is moved into engagement therewith thereby preventing its rotation relatively to said device.

4. A handle assembly according to claim 3, wherein said hold fast body comprises:
    said limit post, said limit post comprising a threaded shaft extending through said slot; and
    a jam nut threadedly engaged on said limit post, said jam nut comprising said compression member and being engageable with said head upon tightening to compress said head to temporarily fix said head in said predetermined position.

5. A handle assembly engageable with a shaft extending from a device, said handle assembly for rotating said shaft to actuate said device, said handle including a lock fitting engageable with a lock for preventing actuation of said device, said handle assembly comprising:
    a head having a receptacle therein sized to receive said shaft;
    an elongated grip attached to said head and projecting outwardly therefrom for facilitating manual rotation of said head when said handle assembly is mounted on said device;
    an arcuate slot positioned in said head and having a concave side facing said receptacle, said slot having first and second ends disposed opposite to one another;
    a limit post fixedly attachable to said device so as to project into said slot, said limit post being engageable with at least one of said first and second ends of said slot to limit rotation of said head relatively to said device;

a stop body positioned within said slot, said stop body having first and second gripping surfaces positioned on opposite sides of said head and engageable therewith, at least one of said gripping surfaces being movable into and out of engagement with said head for compressing said head between said gripping surfaces and thereby temporarily fixing said stop body at a predetermined position in said slot, said stop body being engageable with said limit post to limit rotation of said head, wherein said lock fitting comprises:
  a first aperture extending through said head; and
  a plate fixedly mountable on said device and positionable between said head and said device, said plate having a second aperture extending therethrough, said first and second apertures being alignable with one another for receiving said lock therethrough upon rotation of said head, said lock preventing rotation of said head relatively to said plate when engaged with said apertures.

6. A handle assembly according to claim 5, wherein said plate is attached to said device by a non-removable fastener.

7. A handle assembly according to claim 6, wherein said non-removable fastener comprises a bolt having a break-away head portion and a nut having a break-away head portion, said head portions being engageable by a tool for tightening said nut and said bolt effecting attachment of said plate to said device, said head portions being removable from said bolt and said nut after attachment of said plate, removal of said head portions preventing removal of said bolt and said nut using said tool.

8. A handle assembly engageable with a shaft extending from a device, said handle assembly for rotating said shaft to actuate said device, said handle assembly comprising:
  a head having a receptacle therein sized to receive said shaft;
  a blind hole extending through said head and intersecting said receptacle;
  a pin insertable within said blind hole and engageable with said shaft for retaining said head to said shaft, said head being substantially non-removable from said shaft upon insertion of said pin into said blind hole and engagement with said shaft;
  an elongated grip attached to said head and projecting outwardly therefrom for facilitating manual rotation of said head when said handle assembly is mounted on said device;
  an arcuate slot positioned in said head and having a concave side facing said receptacle, said slot having first and second ends disposed opposite to one another;
  a limit post fixedly attachable to said device so as to project into said slot, said limit post being engageable with at least one of said first and second ends of said slot to limit rotation of said head relatively to said device; and
  a stop body positioned within said slot, said stop body having first and second gripping surfaces positioned on opposite sides of said head and engageable therewith, at least one of said gripping surfaces being movable into and out of engagement with said head for compressing said head between said gripping surfaces and thereby temporarily fixing said stop body at a predetermined position in said slot, said stop body being engageable with said limit post to limit rotation of said head.

9. A handle assembly engageable with a shaft extending from a device, said handle assembly for rotating said shaft to actuate said device, said handle assembly being engageable with a lock for preventing rotation of said shaft, said handle assembly comprising:
  a head having a receptacle therein sized to receive said shaft;
  a first aperture extending through said head; a plate fixedly mountable on said device and positionable between said head and said device, said plate having a second aperture extending therethrough, said first and second apertures being alignable with one another for receiving said lock therethrough upon rotation of said head, said lock preventing rotation of said head relatively to said plate when engaged with said apertures, a plurality of teeth being positioned on said plate along an arcuate path, said teeth extending outwardly away from said receptacle;
  an elongated grip attached to said head and projecting outwardly therefrom for facilitating manual rotation of said head when said handle assembly is mounted on said device; and
  an elongated latch pivotally attached to said grip, said latch having a first end portion engageable with any one of said teeth and a second end portion extending lengthwise along said grip, said first end portion being pivotally movable into and out of engagement with any one of said teeth by manually pivoting said second end portion relatively to said grip to respectively prevent and permit rotation of said head relatively to said plate.

10. A handle assembly according to claim 9, wherein said plate is attached to said device by a non-removable fastener.

11. A handle assembly according to claim 10, wherein said non-removable fastener comprises a bolt having a break-away head portion and a nut having a break-away head portion, said break-away head portions being engageable by a tool for tightening said nut and said bolt effecting attachment of said plate to said device, said break-away head portions being removable from said bolt and said nut after attachment of said plate, removal of said break-away head portions preventing removal of said bolt and said nut using said tool.

12. A handle assembly according to claim 9, further comprising:
  a blind hole extending through said head and intersecting said receptacle; and
  a pin insertable within said blind hole and engageable with said shaft for retaining said head to said shaft, said head being substantially non-removable from said shaft upon insertion of said pin into said blind hole and engagement with said shaft.

13. A handle assembly engageable with a shaft extending from a device, said handle assembly for rotating said shaft to actuate said device, said handle assembly being engageable with a lock for preventing rotation of said shaft, said handle assembly comprising:
  a head having a receptacle therein sized to receive said shaft;
  an arcuate slot positioned in said head and having a concave side facing said receptacle, said slot having first and second ends disposed opposite to one another;
  a limit post fixedly attachable to said device so as to project into said slot, said limit post being engageable with at least one of said first and second ends of said slot to limit rotation of said handle relatively to said device;
  a first aperture extending through said head;
  a plate fixedly mountable on said device and positionable between said head and said device, said plate having a second aperture extending therethrough, said first and second apertures being alienable with one another for receiving said lock therethrough upon rotation of said head, said lock preventing rotation of said head relatively to said plate when engaged with said apertures; and an elongated grip attached to said head and projecting outwardly therefrom for facilitating manual rotation of said head when said handle assembly is mounted on said device.

14. A handle assembly according to claim 13, further comprising a stop body positioned within said slot, said stop body having first and second gripping surfaces positioned on opposite sides of said head and engageable therewith, at least one of said gripping surfaces being movable into engagement with said head for compressing said head between said gripping surfaces and temporarily fixing said stop body at a predetermined position in said slot, said stop body being engageable with said limit post to limit rotation of said head.

15. A handle assembly according to claim 14, wherein said stop body comprises a threaded bolt and a nut engageable with said bolt, said bolt extending through said slot and having a bolt head comprising said first gripping surface positioned on one side of said head, said nut comprising said second gripping surface and being positioned on an opposite side of said head, said bolt being fixed in said predetermined position upon tightening of said nut onto said bolt.

16. A handle assembly according to claim 9, further comprising a hold fast body for temporarily preventing rotation of said head, said hold fast body being fixedly attachable to said device, said hold fast body having a compression member positioned adjacent to said head, said compression member being movable into and out of engagement with said head, said head being temporarily fixed in a predetermined position when said compression member is moved into engagement therewith thereby preventing its rotation relatively to said device.

17. A handle assembly according to claim 16, wherein said hold fast body comprises:

said limit post, said limit post comprising a threaded shaft extending through said slot; and a jam nut threadedly engaged on said limit post, said jam nut comprising said compression member and being engageable with said head upon tightening to compress said head to temporarily fix it in said predetermined position.

\* \* \* \* \*